(12) United States Patent
Patel et al.

(10) Patent No.: US 7,573,048 B2
(45) Date of Patent: Aug. 11, 2009

(54) TAMPER RESISTANT SELF INDICATING INSTANT ALERT RADIATION DOSIMETER

(76) Inventors: Gordhanbhai N. Patel, 133 Walnut, Somerset, NJ (US) 08873; Paresh Patel, 133 Walnut, Somerset, NJ (US) 08873

( * ) Notice: Subject to any disclaimer, the term of this patent is extended or adjusted under 35 U.S.C. 154(b) by 683 days.

(21) Appl. No.: 11/235,892

(22) Filed: Sep. 27, 2005

(65) Prior Publication Data
US 2007/0246541 A1  Oct. 25, 2007

Related U.S. Application Data

(60) Provisional application No. 60/617,216, filed on Oct. 8, 2004.

(51) Int. Cl.
*G01T 1/02* (2006.01)
(52) U.S. Cl. .................................. 250/474.1
(58) Field of Classification Search ............... 250/474.1
See application file for complete search history.

(56) References Cited

U.S. PATENT DOCUMENTS

| | | | |
|---|---|---|---|
| 3,894,238 A | 7/1975 | Cox et al. ............... 250/484.3 |
| 3,999,946 A | 12/1976 | Patel et al. .................. 422/56 |
| 4,339,407 A | 7/1982 | Leighton ................... 264/229 |
| 4,961,893 A | 10/1990 | Rose .......................... 264/247 |
| 4,970,137 A | 11/1990 | Lewis et al. ................. 430/296 |
| 5,002,852 A | 3/1991 | Lewis et al. ............... 430/270.1 |
| 5,051,597 A | 9/1991 | Lewis et al. ............... 250/474.1 |
| 5,232,820 A | 8/1993 | Lewis et al. .................. 430/338 |
| 5,350,553 A | 9/1994 | Glaser et al. ................. 264/155 |
| 5,399,847 A | 3/1995 | Droz ........................... 235/488 |
| 5,417,905 A | 5/1995 | Lemaire et al. ............. 264/139 |
| 5,423,705 A | 6/1995 | Solomon, II .................. 446/46 |
| 5,498,388 A | 3/1996 | Kodai et al. .................. 264/263 |
| 5,510,074 A | 4/1996 | Rose .......................... 264/261 |
| 5,637,876 A | 6/1997 | Donahue et al. ......... 250/474.1 |
| 5,690,773 A | 11/1997 | Fidalgo et al. .............. 156/267 |
| 5,731,112 A | 3/1998 | Lewis et al. ................... 430/15 |
| 6,241,153 B1 | 6/2001 | Tiffany, III .................. 235/488 |
| 6,256,873 B1 | 7/2001 | Tiffany, III ................... 29/827 |
| 6,285,031 B1 | 9/2001 | Listl et al. ................. 250/474.1 |
| 6,757,492 B1 | 6/2004 | Hall ........................... 396/284 |
| 7,141,350 B2 | 11/2006 | Hall ........................ 430/270.1 |
| 2005/0208290 A1* | 9/2005 | Patel ........................... 428/323 |
| 2006/0145091 A1* | 7/2006 | Patel ........................ 250/474.1 |

FOREIGN PATENT DOCUMENTS

EP    350179    1/1990

\* cited by examiner

*Primary Examiner*—David P Porta
*Assistant Examiner*—Marcus H Taningco

(57) ABSTRACT

A tamper resistant and evident, self indicating instant radiation alert dosimeter (referred to as SIRAD) made by encapsulating a radiation sensing system in a polymeric material is disclosed. SIRAD is made from many layers of polymeric materials by multi-step processes. The radiation sensing system of SIRAD is encapsulated in a polymeric media made by a casting or reaction injection molding process.

19 Claims, 3 Drawing Sheets

TAMPER RESISTANT SELF INDICATING INSTANT ALERT RADIATION DOSIMETER

RELATED APPLICATIONS

This application claims benefit of provisional application 60/617,216 filed Oct. 8, 2004.

STATEMENT REGARDING FEDERALLY SPONSORED RESEARCH

This invention was made in part with government support under contract W91CRB-04-C-0001 awarded by the Technical Support Working Group (funded by Departments of Homeland Security, State, Justice and Defense).

BACKGROUND OF THE INVENTION

1. Field of the Invention

This invention relates to a composite, tamper resistant, radiation sensitive device for instantly monitoring a high dose of high-energy radiations, such as electrons, X-rays, protons, alpha particles and neutrons using color-changing materials and methods of making and using same.

2. Brief Description of Prior Art

Patent application number WO 2004/077097 (U.S. Ser. No. 10/524,096 filed Feb. 4, 2005) which is incorporated herein by reference, describes a radiation sensitive dosimeter. The radiation sensitive dosimeter is typically made by sandwiching a radiation sensitive coating or strip between two plastic layers with a pressure sensitive adhesive. These radiation sensitive dosimeters are referred herein to as SIRAD for Self-indicating, Instant, Radiation Alert Dosimeter. However, these SIRAD badges are not tamper resistant because of the adhesive layer.

Radiation sensitive materials, such as diacetylenes (R—C≡C—C≡C—R, where R is a monovalent group) and processes that can be used for making radiation sensitive coatings or strips for making SIRAD are listed in patent application number WO 2004/077097 and WO 2004/017095 (U.S. Ser. No. 10/545,796, filed Jul. 6, 2006 and Ser. No. 10/524,096, filed Sep. 25, 2005 respectively) incorporated herein by reference and references cited therein. Coatings, films or plaques of radiation sensitive materials which are used to make SIRAD are individually or collectively, referred herein to as "radiation monitoring component", "radiation sensitive coating", "radiation sensitive strip" or "SIRAD strip". Additives, such as UV absorbers that can be used in the present inventions are also listed in patent application number WO 2004/077097 and WO 2004/017095 and references cited therein.

Smart cards are typically one composite pieces of plastic. It is almost impossible to access the encapsulated electronic components of smart cards without cutting the cards. Smarts cards are typically tamper resistant and evident. To the best of our knowledge, there has been no report of a radiation sensitive smart card.

Smart cards are used as bankcards, ID cards, telephone cards and the like. Smart cards are usually made by embedding electronic components between several layers of plastic sheets in a sandwich array. If the electronic components can withstand high temperature, smart cards are made by encapsulating them in molten polymeric materials. Recently smarts cards have been made by encapsulating electronic components in polymeric materials by a technique commonly known as reaction injection molding.

U.S. Pat. No. 6,241,153 to Tiffany, III; Harry J. and U.S. Pat. No. 6,256,873 to Tiffany, III; Harry J. describe methods of making smart cards having high quality external surfaces by making use of a primer/adhesive (and, optionally, anchor hooks) on the lower surface of an electrical component in order to affix said electrical component to a thermosetting material that becomes the core layer of said cards.

European patent 350179 to Arvis; Charles Richard discloses a smart card wherein electronic circuitry is encapsulated in a layer of a reaction moldable polymeric material that is introduced between the card's two surface layers. Similarly European Patent Application 95400365.3 teaches a method for making contactless smart cards where an electronic module is encapsulated with a polymerizable resin material between upper and lower thermoplastic sheets.

U.S. Pat. No. 5,399,847 to Droz; Francois teaches a credit card that is comprised of three layers, namely, a first outer layer, a second outer layer and an intermediate layer. The intermediate layer is formed by injecting a thermoplastic binding material that encases the electronic elements in the intermediate layer material. The binding material is made of a blend of copolyamides or a glue having two or more chemically reactive components that harden upon contact with air. The outer layers of this smart card can be made up of various polymeric materials such as polyvinyl chloride or polyurethane.

U.S. Pat. No. 5,417,905 to Lemaire; Gerard and Lemaire; Philippe teaches a method for manufacturing plastic credit cards wherein a mold tool comprised of two shells is closed to define a cavity for producing such cards. A label or image support is placed in each mold shell.

Making of smart cards is also disclosed in other patents including U.S. Pat. Nos. 4,339,407, 4,961,893, 5,350,553, 5,423,705, 5,498,388 and 5,510,074. All of these prior art methods for making smart cards are usually for encapsulating electronic components or circuitry inside the smart card. Often the electronic components are held in place with a glue sometimes isotropic thermoset adhesive materials.

We have discovered that tamper resistant SIRAD can be made by encapsulating radiation sensitive coating or strip in a polymeric material. Tamper resistant smart SIRAD cards are also referred herein to as tamper resistant SIRAD or TR-SIRAD.

The core polymeric materials that can be used for making tamper resistant SIRAD badges are well known in the art. They are usually monomeric and oligomeric materials and polymerized and/or crosslinked with a catalyst for fast polymerization. Monomers, oligomers and crosslinkable polymers are referred to as pre-polymers. Monomers, oligomers and polymer that can be used to make tamper resistant SIRAD cards are also listed in patent application number WO 2004/017095.

Essentially any regular or irregularly shaped article can be produced by molding, i.e., injecting a molten polymer in to a mold. Thick film, plaques and blocks of a variety of plastics are also routinely casted from their monomers or oligomers, such as acrylics, urethane and epoxy followed by their polymerization. For example, (1) an epoxy polymer can be prepared by reacting an epoxide, preferably an oligomeric epoxide with a primary amine or a diepoxide with a di-secondary amine, and (2) a polyurethane/polyurea can be prepared by reacting a diisocyanate, preferably an oligomeric, with a diol or diamine, preferably an oligomeric diol or diamine. By selecting a proper molecular weight and nature of the amines or other catalysts, one can control the rate of polymerization or curing. These non-diacetylenic monomers and oligomers are referred to hereafter as core materials or core layer(s).

SUMMARY OF THE INVENTION

Figure 1:
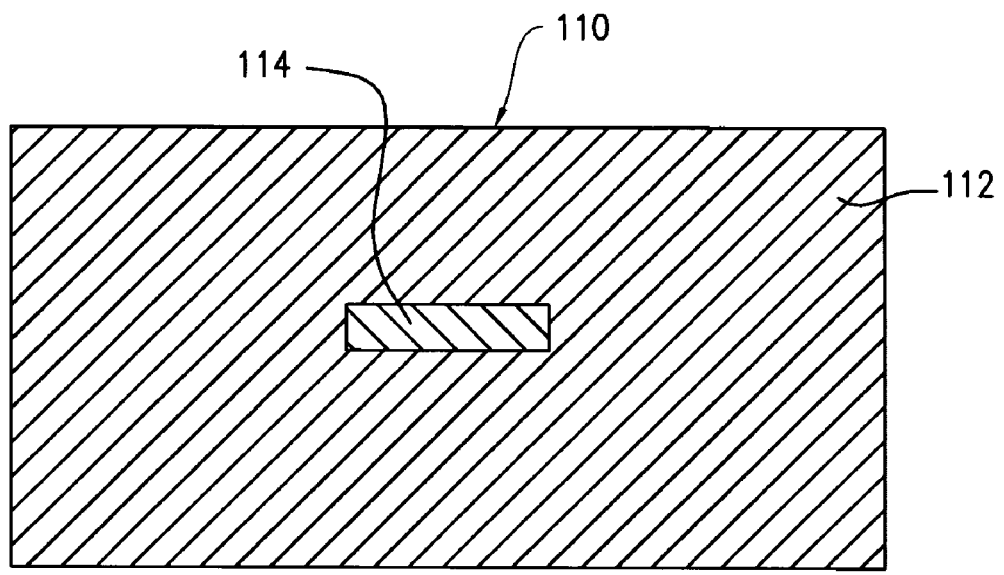
FIG. 1. A schematic presentation of cross sectional view of the device showing the location of the radiation sensing component.

There is provided a unitary, tamper resistant, directly readable radiation monitoring device for monitoring radiation of higher energy than UV light having an upper and a lower surface. The device comprises a radiation monitoring component which changes color in proportion to the radiation energy received. This component is embedded in a polymer matrix. The matrix is so arranged that at least one surface of the radiation monitoring device is visually observable so that any change in the color thereof can be observed. There is further provided means for preventing ultraviolet radiation from reaching the monitoring component while permitting passage of higher energy radiation.

The blocking means may take several forms or combinations. In one mode the embedding polymer comprises UV absorbent material. In another mode the UV blocking means may be located on said upper and lower surfaces at least one of which is transparent to the observation of color change in said radiation detection means. Thus the blocking means may be permanently attached to either or both surfaces, as for example a UV blocking film adhered to or bonded to the surfaces, or as moveable cover such as a book cover which may be opened to observe the color of the radiation monitoring component. It may also be permanently embedded in the device as the second layer as further discussed below.

Suitably, at least one observable reference chart for estimation of radiation exposure/dose is located proximal to said radiation monitoring component.

The radiation monitoring component is not limited to any particular material, however it has been found that materials with at least one diacetylene functionality may be formulated to provide desired ranges of sensitivity and color change response.

While the invention is not limited thereto, it has been found convenient to provide a device initially comprising at least two layers with the radiation device placed and bonded therebetween. In the finished device these layers are integrally bonded to each other so that they cannot be readily separated without destruction of the device and/or the radiation monitoring component.

Suitably at least one of the layers of the device is a polymeric core layer. This layer may be a cast polymer or a reaction injection molded layer.

In order to avoid damage to, or deterioration of the radiation monitoring component, the cure temperature of the polymer of the core layer is set to be below the fixation temperature of the radiation monitoring component. It is for this reason that most conventional heat-based lamination methods are not suitable for formation of the device of the present invention. Suitable materials for the core layer include but are not limited to members selected from the group consisting of polyurethane, polyepoxy, polyester, polyacrylate, polyolefins, polyvinyls and polysilicone.

The second layer may be totally UV opaque or even ordinary light opaque, such as paper, cardboard, metal and polymer suitably the latter two such as metal foil, polyester, polyolefin, polyvinyl or polycarbonate. Where the second layer is polymeric, it may contain UV blocking materials. Clearly, if the second layer is visually opaque, the monitoring device must be observable through the core layer.

In order for the device to be most rapidly useful, there is provided at least one observable color reference chart located proximal to the radiation monitoring component so that color changes can be rapidly read. It is most suitable for these two components to be initially adhered to what will become the inner surface of the second layer, and the core layer then bonded thereto. Alternatively, the radiation monitoring component is adhered to the second layer and the color reference chart is printed on this second layer.

As stated previously the core layer and thus the bonding integration of the entire device may be made by casting or reaction injection molding the polymer. For example, by reacting at least one polyisocyanate and one polyol or by reacting at least one epoxide and an amine. The bonding process also includes polymerization of at least one ethylenic, vinyl or acrylic monomer or oligomers The device may be used to measure both short term exposure to radiation or long term accumulation of it. In particular it may be used for monitoring radiation sources which include but are not limited to X-ray, gamma ray, electron, protons, alpha particles or neutron radiation. In every case, the method of use includes observing the color change in the radiation monitoring component thereof after irradiation and estimating the dose exposure by comparing its color with the color reference chart.

Tamper resistant SIRAD cards can be comprised of a top layer, a bottom layer and a middle or core layer containing radiation sensitive strip. The core layer can be made by casting or reaction injection molding techniques (which are often referred to as a "RIM" for reaction injection molding). Either thermoplastic or thermosetting materials can be used for making the core layer. Some representative polymeric materials (thermoplastic or thermosetting) that can be used for making top and bottom layers includes polyvinyl chloride, polyvinylidine chloride, polyvinyl acetate, polyethylene, polypropylene, polyethylene-terephthalate, polycarbonate, polyurethane, acrylonitrile butadiene styrene, vinyl acetate copolymer, polyesters, polyethylene, polynaphthelene ester, cellulose acetate, cellulose acetate butyrate, epoxy and silicones.

A large number of monomers and oligomers can be used to make the material for core layer. The most preferred thermosetting materials for the SIRAD's core layer are polyurethane, epoxy and unsaturated polyester. Polymeric materials such as polyurethanes made by condensation reactions of an isocyanate and a polyol derived from propylene oxide or trichlorobutylene oxide are especially preferred. Of the various polyesters that can be used for making core layer of SIRAD are "ethylenic unsaturated" are particularly preferred because of their ability to be cross link through their double bonds with other compatible monomers (also containing ethylene unsaturation) and with the materials out of which top and bottom layers are made (e.g., polyester and polyvinyl chloride). Also preferred are epoxy materials made from epichlorohydrin and bisphenol A or epichlorohydrin and an aliphatic polyol. They are particularly preferred because of their ability to bond with some of the preferred materials (e.g., polyvinyl chloride) used as top and bottom layers. These three general kinds of thermosetting material, (polyurethane, epoxy and unsaturated polyester), are most preferred because they do not tend to chemically react with adhesive such as cyanoacrylate and acrylate used to hold radiation sensitive strip and coating of SIRAD in place during casting or molding.

As an alternative to RIM process and materials, one can use hot melt adhesive which melts at temperature below the fixing (or inactivation) temperature of the sensing strip. The hot melt adhesive may contain crosslinking agents for crosslinking after the melting.

There is provided a one piece composite radiation dosimeter composed of radiation sensitive material encapsulated in a core polymeric material.

There is provided a tamper and environmentally resistant SIRAD card by encapsulating sensing strip or coating of SIRAD in a polymeric material.

There is provided methods of making TR-SIRAD cards by encapsulating the sensing strip or coating of SIRAD in polymerizable monomers and oligomers followed by their polymerization.

There are provided methods of making TR-SIRAD cards by encapsulating the sensing strip or coating of SIRAD in polymerizable monomers and oligomers followed by their polymerization between a lower and an upper layer.

There are provided methods of making TR-SIRAD cards by encapsulating the sensing strip or coating of SIRAD in a polymeric core layer.

There are provided methods of making TR-SIRAD cards by encapsulating the sensing strip or coating of SIRAD in molten polymers having melting point below the fixing (i.e., inactivation) temperature of the sensing strip followed by cooling.

There is also provided a method of monitoring radiation originating from process of irradiation of TR-SIRAD cards with UV, X-ray, gamma ray, electron, protons, alpha particles or neutron radiation, producing a noticeable color change in a sensing strip or coating of SIRAD and estimating the dose by comparing its color with the color reference chart.

DETAILED DESCRIPTION OF PREFERRED EMBODIMENTS

The invention can be best described by reference to the FIGS. 1-4.

In the following description the "hundreds" digit indicates the figure, the tens and units digits refer to the item regardless of the "hundreds" digit the remaining two digits always indicate the same item.

FIG. 1 illustrates a general embodiment of the invention showing the radiation monitoring device 110 comprising a radiation sensing strip 114 which changes color in relationship to the amount of radiation (rads) received, embedded in a core 112 to substantially prevent tampering with the strip 114 without destruction of the entire device.

Figure 2:
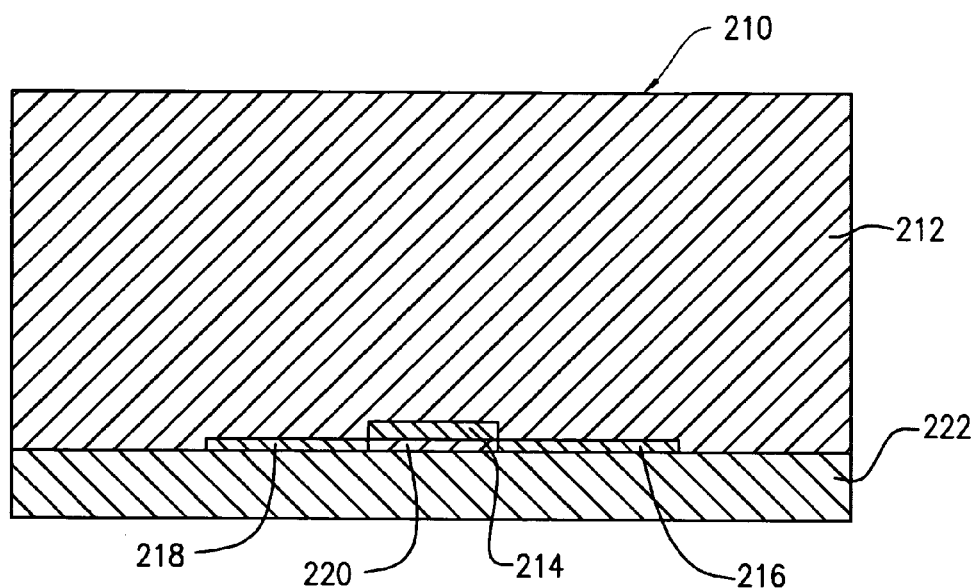
FIG. 2. A schematic presentation of cross sectional view of a further embodiment of FIG. 1.

FIG. 2 illustrates one of the preferred modifications of the device 210. In this modification there is provided a UV and visible light opaque layer 222 which may comprise metal, cardboard or most suitably polymer. To layer 222 there is affixed radiation sensing strip 214, suitably by means of an adhesive 220. At least one color chart 216 (and/or 218) is located proximate to the strip 214. Depending on the nature of layer 222, this color chart 216 may be printed directly onto layer 222 or affixed to it. UV blocking, but visually transparent core layer 212 is integrally bonded to layer 222 and strip 214 and color chart 216 (and/or 218). In view of the temperature sensitivity of many, indeed the preferred, radiation monitoring material of strip 214, and the need to achieve a high level of tamper resistance of the device as a whole, the components which will cure to provide bonding core layer 212 are provided to the remaining components by casting or reaction injection molding at a temperature below the fixation temperature of the radiation monitoring material.

Figure 3:
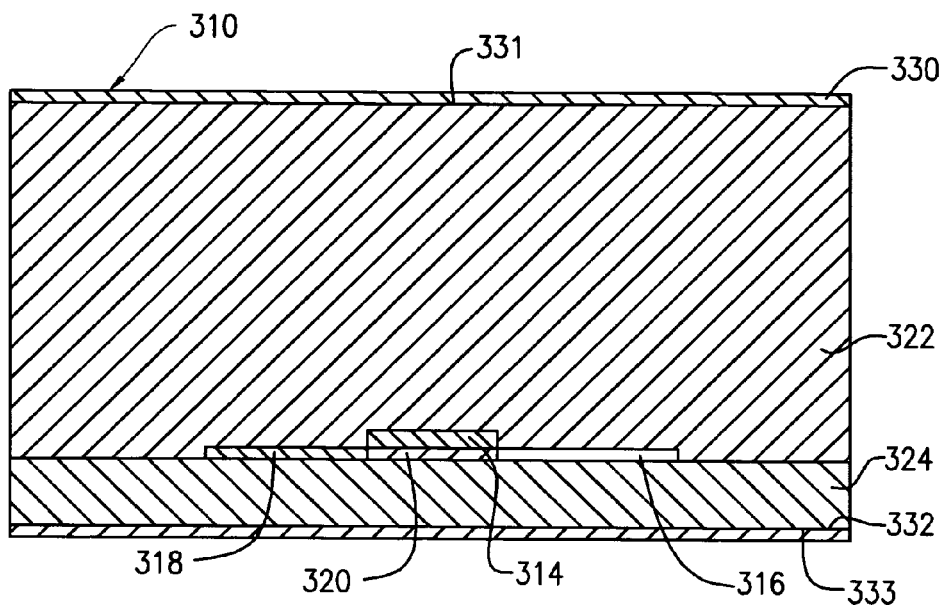
FIG. 3. A schematic presentation of cross sectional view of a further embodiment of FIG. 2.

FIG. 3 is a variant of FIG. 2. In this mode both the core layer 322 and the bottom layer 324 are transparent to visual and UV light. However there are provided UV blocking means 330 and 332 placed on the top and bottom surfaces 331 and 333 respectively. These blocking means may be coatings, sheeting, or externally affixed flaps, like book covers. Whatever means are chosen, visual access to at least one transparent surface is required so any color change in sensing strip 314 and the color chart 316 (and/or 318) is available.

Figure 4:
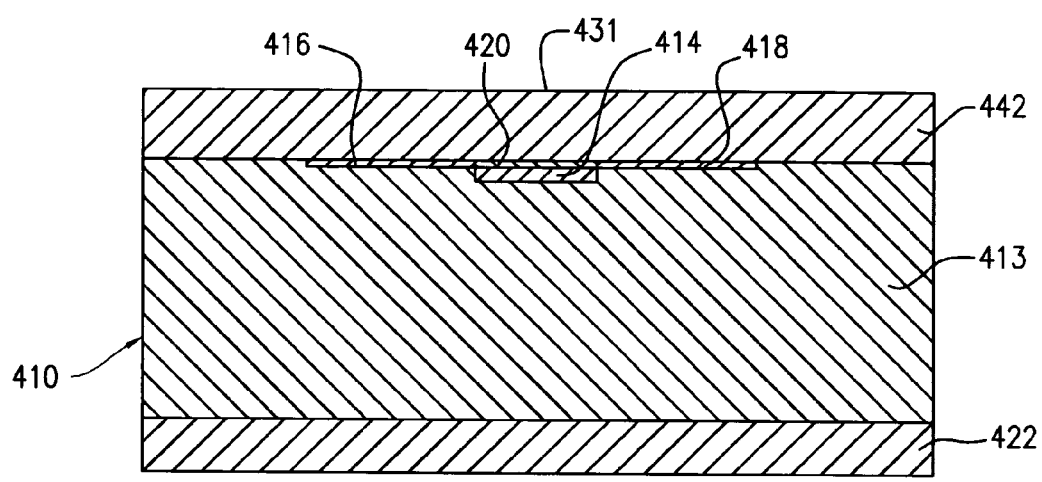
FIG. 4. A schematic presentation of cross sectional view of a further embodiment of FIG. 2.

In the embodiment of FIG. 4, the sensing strip 414, held in place by adhesive 420 as well as color chart 416 (and/or 418) are located on a visually transparent, but UV blocking layer 422. The core layer 413 is UV transparent but has integrated therewith a visually and UV opaque "bottom" layer 422. The strip 414 and the color charts 416 (and/or 418) are located and presented to be readable through surface 431.

Radiation sensitive materials, such as diacetylenes can be used to make radiation sensitive coatings and strips of SIRAD. The process of making them are described in patent application number WO 2004/077097 and WO 2004/017095 and references cited therein and are included herein by reference.

A large number of polymeric materials can be used as a core layer for TR-SIRAD. Monomers, oligomers and polymers that can be used to make the core layer for TR-SIRAD are described in patent application number WO 2004/077097 and WO 2004/017095 and references cited therein and are included herein by reference. The core layer can be made from molten polymer or by polymerization of monomers and oligomers, including the following:

In the two component systems, polyepoxy, polyurea, polycarbonate, polyester, polysilicones and polyurethane are preferred. The oligomeric pre-polymer systems, such as diepoxide, diamines, diols and diisocyanates, are available commercially from several suppliers such as Dow, Bayer, Monsanto, Witco, Union Carbide and several small companies. If one of the pre-polymers is tri-functional, a crosslinked (thermoset) article can be obtained. The core layer can be homopolymers, copolymers, graft-copolymers, block copolymers, polymeric alloys and mixtures thereof.

We tried several oligomeric diol and triols including glycerol propoxylate, poly(1,4-butylene glutarate) hydroxy terminated, polycaprolactone triol, poly[di(ethylene glycol) phthalate] diol, polyester-block-polyether alpha omega-diol, poly(ethylene-co-1,2-butylene) diol, poly(ethylene-co-1,2-butylene) diol, poly(ethylene glycol), poly(propylene glycol), poly(ethylene glycol)-poly(propylene glycol), poly (hexamethylene carbonate) diol, polytetrahydrofuran, polyurethane diol, and poly(ethylene-co-1,2-butylene) mono-ol as a class of pre-polymer for making the core layer with and without UV absorbers. The pre-polymeric diols mentioned above were reacted with di and polyisocyanates including poly(hexamethylene diisocyanate), poly(propylene glycol) tolylene 2,4-diisocyanate terminated, poly(1, 6hexamethylene diisocyanate) trimeric, poly[(phenyl isocyanate)-co-formaldehyde] and several commercially available diisocyanates, e.g., hexamethylene diisocyanate, Lord Chemical UR-312 Resin, Lord Chemical UR-324 Resin and Tadco isocyanate Formula 11B51A.

The core layer was also prepared by reacting monomeric and oligomeric pre-polymers such as acrylics followed by polymerization of the pre-polymers with a catalyst, such as benzoyl peroxide. A promotor (e.g., N,N-Dimethyl-p-toluidine) was used for rapid polymerization of the pre-polymers at a lower temperature. A large number of monomers and oligomers are used to make polymers. They include unsaturated monomers such as olefins, vinyls, acrylates, and methacrylates such as methylmethacrylate, methylacrylate, styrene, acrylic acid, butane diol 1,4-dimethacrylate, diethylene glycol diacrylate, diethylene glycol dimethacrylate, ethylene glycol dimethacrylate, hexanediol-1,6-dimethacrylate, methylstyrene-alpha-pentaerylthrioltriacrylate, polyethylene glycol dimethacrylate, polypropylene glycol dimethacrylate, triethylene glycol dimethacrylate, 4-(Vinyloxy) butyl benzoate, bis[4-(vinyloxy)butyl] adipate, bis[4-(vinyloxy)butyl] succinate, 4-(vinyloxymethyl)cyclohexylmethyl, bis[4-(vinyloxy)butyl] isophthalate, bis[4-(vinyloxymethyl)cyclohexylmethyl], tris[4-(vinyloxy)butyl] trimellitate, 4-(vinyloxy)butyl stearate, bis[4-(vinyloxy)butyl] hexanediylbiscarbamate, bis [[4-[(vinyloxy)methyl]cyclohexyl]methyl], bis[[4-[(vinyloxy)methyl]cyclohexyl] methyl], and bis[4-(vinyloxy)butyl] (4-methyl-1,3-phenylene). These and other monomers and oligomers that can be polymerized by radical and cationic polymerization using peroxide and ultraviolet light are described in "Chemistry and Technology of UV and EB Formulations for Coatings, Inks, & Paints" by Oldring, P.K.T., Ed.; SITA Technology: London, can be used for making the core layer. A large number of monomers, oligomers and polymers commercially available are listed in catalogs such as Aldrich Chemical, Milwaukee, Wis.

The foregoing recitation of embodiments, as well as the following exemplifications are merely illustrative but not limiting. Other variants providing similar results can be readily deduced by those skilled in the art therefrom and are to be considered to be within the scope of the present invention.

The TR-SIRAD cards offer the following major advantages over the SIRAD cards described in patent application number WO 2004/077097:

They prevent diffusion of water and other liquids.
They can't be easily tampered and if tampered it will be evident.
They would be cost effective as they are made in fewer steps.
They would provide better protection from environment.
They can be made at a lower temperature and hence would not damage the radiation sensitive material.

EXAMPLES

The following Examples are illustrative of carrying out the claimed invention but should not be construed as being limitations on the scope and spirit of this invention.

Example 1

Making of Mold and Prototype TR-SIRAD Cards

A mold was made from a one millimeter thick Teflon sheet by cutting a 5.3 cm×8.5 cm hole. Three types of basic prototype TR-SIRAD cards were created as shown below:

Example 1.1

Without Top and Bottom Layers

In order to create TR-SIRAD without the top and bottom layers, (1) the mold was placed on a flat polyester film having a silicone release layer, (2) a radiation sensitive strip with or without the color reference chart was placed in the middle, (3) the core formulation was prepared and poured in the mold, and (4) the top was covered with another flat polyester film with a silicone release. Once the core formulation was cured, the release films and the mold were removed.

Example 1.2

With only One, Top or Bottom Layer

In order to create TR-SIRAD with only one layer, either top or bottom, (1) the mold was placed on a top or bottom layer, e.g., a polyester film or aluminum foil, (2) a radiation sensitive strip with or without the color reference chart was stuck e.g., with an adhesive, in the middle, (3) the core formulation was prepared and poured in the mold, and (4) the assembly was covered with another flat polyester film with a silicone release. Once the core formulation was cured, the top release film and the mold were removed.

Example 1.3

With Top and Bottom Layers

In order to create TR-SIRAD with the top and bottom layers, (1) the mold was placed on a flat bottom layer, e.g., polyester film or aluminum foil, (2) a radiation sensitive strip with or without the color reference chart was stuck, e.g., with an adhesive, in the middle, (3) the core formulation was prepared and poured in the mold, and (4) the assembly was covered with the top layer, e.g., UV absorbing polyester film. Once the core formulation was cured, the mold was removed.

The following core layers were used to make prototype TR-SIRAD cards.

Example 2

Use of Two Reactants to Make the Core Layer

Fifteen grams of the poly(propylene glycol), molecular weight about 1000 was added into 10 g of poly(isophorone diisocyanate) molecular weight 1500 and 0.25 g of a tin catalyst (Metacure T-9 of Air Products, Allentown, Pa.) followed by mixing. The mixture was poured into the mold assembly of Example-1.1 having a radiation sensitive strip and covered with. flat polyester film with a silicone release. The mixture became solid in about ten minutes. The assembly was annealed at 60° C. for ten more minutes for maximum curing. One device was left at room temperature which cured in about a few days. The card was removed from the mold. When irradiated with 50 rads of 100 KVP X-ray the sensing strip developed a light blue color.

The time required for curing can be reduced to seconds by increasing concentration of the catalyst.

Example 3

Core Layer from Monomer and Polymer Mixture

To ten grams of HH772 casting and embedding kit (Polysciences, Warrington, Pa. 18976) which was a mixture 30% polymethylmethacrylate dissolved in 70% methylmethacrylate monomer, was added 1.0 g of 5% benzoyl peroxide dissolved in dibutyl phthalate and 3 drops of a promotor (N,N-dimethyl toluidine) followed by mixing. The mixture was poured into the mold assembly of Example-1.2 having a radiation sensitive strip and color reference chart attached to a white but opaque 100 microns thick polyester film. The mixture became solid in about five minutes. The assembly was annealed at 60° C. for ten more minutes. One device was left The card was removed from the mold. When irradiated with 50 rads of 100 KVP X-ray the sensing strip developed a blue color which matched the color reference bar printed for 50 rads.

The time required for curing can be reduced to seconds by increasing concentration of the catalyst.

Example 4

Two Reactants to Make the Core Layer

A mixture of 15 g of poly(ethylene glycol), mol. Wt. 400 and 7.5 g 1,6-hexamethylene diisocyanate was prepared in a vial. To the mixture was added while stirring 1.0 g triethylamine. The mixture was stirred and poured into the mold assembly of Example 1.3 having a radiation sensitive strip and color reference chart attached to a white but opaque 100 microns thick polyester film. After pouring the mixture, the assembly was covered with a UV absorbing/reflecting film having antiglare and a scratch resistant hard coat. The mixture became solid in about fifteen minutes. The assembly was annealed at 60° C. for ten more minutes. The card was removed from the mold. When irradiated with 50 rads of 100 KVP X-ray the sensing strip developed a blue color which matched the color reference bar printed for 50 rads.

The time required for curing can be reduced to seconds by increasing concentration of the catalyst.

Example 5

Polysilicone as Core Layer

Using the procedure described in example 4, TR-SIRAD cards were made using silicon polymeric as a core layer made by mixing SC-102 Hardener of Lord Chemical and SC-102 Resin of Lord Chemical.

The rate of polymerization and curing of the core layer was deliberately kept slow so prototype TR-SIRAD cards can be in a laboratory for demonstrating feasibility of the concept. The rate of curing can be increased by selecting proper monomers, oligomers, polymers, catalysts, promotors and other additives and their concentrations for manufacturing of TR-SIRAD.

The time required for curing can be reduced to seconds by increasing concentration of the catalyst.

Example 6

SIRAD by RIM Method

A clear polyester film is pre-printed with color reference bars and another opaque polyester film is printed with instructions for the user. A radiation sensitive strip having a pressure sensitive coating is mounted between the color reference bars on the clear film. The films are then placed in a RIM mold having gap of about 700 microns, with radiation sensing strip facing the opaque film. A mixture of a liquid polyisocyanate and a liquid polyol containing a catalyst for fast curing is injected in the mold. The mixture becomes solid in seconds. The card is removed from the mold and die-cut. When irradiated with 50 rads of 100 KVP X-ray the sensing strip develops a blue color which matches the color reference bar printed for 50 rads.

The invention claimed is:

1. A unitary tamper resistant directly readable radiation monitoring device for monitoring of radiation of higher energy than UV light having an upper and a lower surface, comprising a radiation monitoring component which changes color in proportion to the radiation energy received, said component being embedded in a polymer matrix, further comprising means for preventing ultraviolet radiation from reaching said monitoring component while permitting passage of said higher energy radiation, wherein at least one surface of said radiation monitoring device is visually observable, whereby any change in the color thereof can be observed further comprising at least two integrally bonded layers with said radiation monitoring component located therebetween, which cannot be readily separated without destruction of the device wherein at least one of said layers is a polymeric core layer and wherein the cure temperature of the polymer of the core layer is below the fixation temperature of the radiation monitoring component.

2. The device of claim 1 wherein the embedding polymer comprises UV blocking material.

3. The device of claim 1 comprising UV blocking means located on said upper and lower surfaces at least one of which is transparent to the observation of color change in said radiation monitoring means.

4. The device of claim 1 further comprising at least one observable color reference chart for estimation of level of radiation exposure, located proximal to said radiation monitoring component.

5. The device of claim 1 wherein said core layer is a casted polymer.

6. The device of claim 1 wherein said core layer is a reaction injection molded layer.

7. The device of claim 1 wherein said core layer is a casted polymer.

8. The device of claim 1 wherein said core layer is a reaction injection molded layer.

9. The device of claim 1 where the core layer is selected from the group consisting of polyurethane, polyepoxy, polyester, polyacrylate and polysilicone.

10. The device of claim 1 comprising the core layer, and a second layer selected from the group consisting of paper, cardboard, metal and polymer.

11. The device of claim 10 further comprising at least one observable color reference chart locate proximal to said radiation monitoring component.

12. The device of claim 11 wherein said radiation monitoring component and said color chart are adhered to said second layer.

13. The device of claim 11 wherein the radiation monitoring component is adhered to said second layer and said color chart is printed on said second layer.

14. The device of claim 11 wherein both layers are UV blocking.

15. The device of claim 11 wherein one of said layers is UV blocking and the other further comprises a UV blocking layer attached thereto.

16. The device of claim 11 wherein neither of said layers is UV blocking and both further comprise a UV blocking layer attached thereto.

17. The device of claim 10 wherein the second layer is a metal foil, polyester, polyolefin, polyvinyl or polycarbonate.

18. A unitary tamper resistant directly readable radiation monitoring device for monitoring of radiation of higher energy than UV light having an upper and a lower surface, comprising a radiation monitoring component which changes color in proportion to the radiation energy received, said component being embedded in a polymer matrix, further comprising means for preventing ultraviolet radiation from reaching said monitoring component while permitting passage of said higher energy radiation, wherein at least one surface of said radiation monitoring device is visually observable, whereby any change in the color thereof can be observed wherein the radiation monitoring component has a diacetylene functionality further comprising at least two integrally bonded layers with said radiation monitoring component located therebetween, which cannot be readily separated without destruction of the device wherein at least one of said layers is a polymeric core layer and wherein the cure temperature of the polymer of the core layer is, below the fixation temperature of the radiation monitoring component.

19. The device of claim 18 where the core layer is selected from the group consisting of polyurethane, polyepoxy, polyester, polyacrylate and polysilicone.

* * * * *